Patented Feb. 5, 1929.

1,701,248

UNITED STATES PATENT OFFICE.

HERMANN WAGNER, OF BAD SODEN-ON-THE-TAUNUS, AND BARTHOLOMÄUS VOSSEN, OF HOCHST-ON-THE-MAIN, GERMANY, ASSIGNORS TO GRASSELLI DYESTUFF CORPORATION, OF NEW YORK, N. Y., A CORPORATION OF DELAWARE.

YELLOW MONOAZO DYESTUFFS FAST TO LIGHT AND PROCESS OF PREPARING THEM.

No Drawing. Application filed August 13, 1927, Serial No. 212,849, and in Germany August 19, 1926.

Our present invention relates to yellow monoazo dyestuffs fast to light and process of preparing them.

We have found that valuable, very pure, yellow monoazo dyestuffs of particularly good fastness to light are obtained by diazotizing the 2.5.6-trichloro-3-amino-1-methyl-benzene-4-sulfonic acid and coupling it with compounds of the following formula

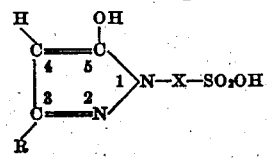

wherein X stands for a phenylene group whose hydrogen atoms are substituted or not, and R for the groups alkyl, carboxyl, or carboxyl ester, such as for instance 1-sulfophenyl-3-methyl-5-pyrazolone, or 1-sulfophenyl-5-pyrazolone-3-carboxylic acid, or 1-sulfophenyl-5-pyrazolone-3-carboxylic acid ester or 1-(3-sulfo-6-chloro)-phenyl-3-methyl-5 pyrazolone or the like. The 2.5.6-trichloro-3-amino-1-methylbenzene-4-sulfonic acid can be prepared by chlorinating para-toluenesulfonic acid, ortha-chlorotoluene-para-sulfonic acid or 2.6-dichlorotoluene-4-sulfonic acid until these compounds have attained the weight of a trichloro compound, and then nitrating and reducing the product so obtained, as more fully described in our copending application Serial No. 212,850, filed August 13, 1927. For example, 27,55 parts of 1-methyl-2.5.6-trichlorobenzene-4-sulfonic acid are dissolved at 70° C. in 85,5 parts of sulfuric acid of 97% strength. Into the solution so prepared 10,25 parts of nitric acid of 62% strength are caused to run at 70° C. in the course of 3 hours. The whole is stirred for 5 hours at 70° C., the nitro-sulfonic acid which has formed is separated in known manner from the sulfuric acid and then reduced to the amino compound as usual. The dyestuffs obtainable according to our present invention are distinguished by an excellent fastness to light and are in this respect by far superior to the hitherto known best yellow dyestuffs as for instance flavazine 3GL and fast light yellow 3G.

The following example serves to illustrate our invention, but it is not intended to limit it thereto; the parts are parts by weight:—

290,5 parts of 2.5.6-trichloro-3-amino-1-methyl-benzene-4-sulfonic acid are dissolved together with 40 parts of caustic soda in 10000 parts of water. To this solution are added 70 parts of sodium nitrite, and the solution so prepared is caused to run into a mixture of 5000 parts of ice with 350 parts of hydrochloric acid of 22° Bé. The whole is then stirred for one hour. The diazo solution thus obtained is introduced into a solution, cooled to 0° C. to 5° C., prepared of 288,5 parts of 1-(3-sulfo-6-chloro)-phenyl-3-methyl-5-pyrazolone, 250 parts of sodium carbonate and 5000 parts of water. The mass is further stirred for 8 hours and the product of the reaction is then salted out, filtered and dried.

The dyestuff thus obtained dyes wool a pure yellow shade of excellent fastness to water, sodium carbonate and hot pressing, and of an eminently good fastness to light. It corresponds probably to the formula:

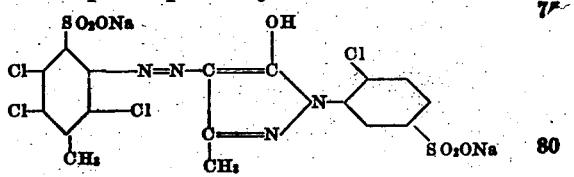

We claim:

1. The process of preparing yellow monoazo dyestuffs fast to light by diazotizing the 2.5.6-trichloro-3-amino-1-methylbenzene-4-sulfonic acid and coupling it with a compound of the following formula:

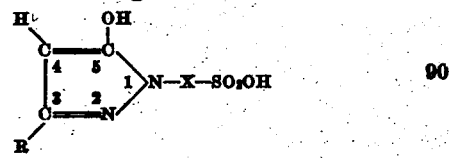

wherein X stands for a phenylene group whose hydrogen atoms are substituted or not, and R for the groups alkyl, carboxyl, or carboxyl ester.

2. The process of preparing yellow monoazo dyestuffs fast to light by diazotizing the 2.5.6-trichloro-3-amino-1-methylbenzene-4-sulfonic acid and coupling it with a compound of the following formula:

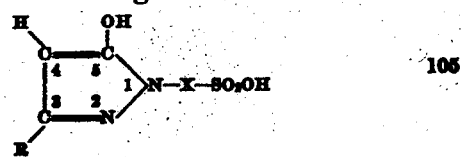

wherein X stands for a phenylene group whose hydrogen atoms are substituted or not, and R for the groups methyl, carboxyl, or carboxyl ester.

3. The process of preparing yellow monoazo dyestuffs fast to light by diazotizing the 2.5.6 - trichloro-3 - amino - 1 - methylbenzene - 4-sulfonic acid and coupling it with a compound of the following formula:

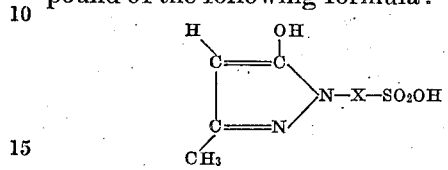

wherein X stands for a phenylene group whose hydrogen atoms are substituted or not.

4. The process of preparing a yellow monoazo dyestuff fast to light by diazotizing the 2.5.6 - trichloro-3 - amino - 1 - methylbenzene - 4-sulfonic acid and coupling it with the compound of the following formula:

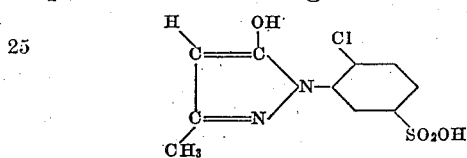

5. As new products, monoazo dyestuffs of the following formula:

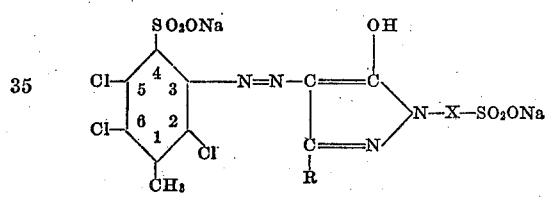

wherein X stands for a phenylene group whose hydrogen atoms are substituted or not and R for the groups alkyl, carboxyl or carboxyl ester, the said dyestuffs yielding yellow dyeings of excellent fastness to light.

6. As new products, monoazo dyestuffs of the following formula:

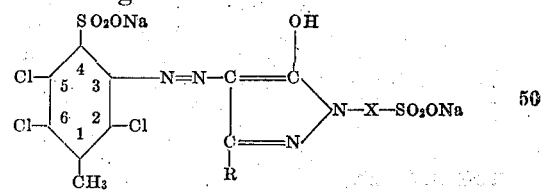

wherein X stands for a phenylene group whose hydrogen atoms are substituted or not and R for the groups methyl, carboxyl or carboxyl ester, the said dyestuffs yielding yellow dyeings of excellent fastness to light.

7. As new products, monoazo dyestuffs of the following formula:

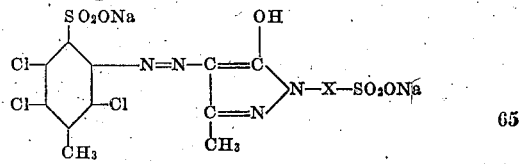

wherein X stands for a phenylene group whose hydrogen atoms are substituted or not, the said dyestuffs yielding yellow dyeings of excellent fastness to light.

8. As a new product, the monoazo dyestuff of the following formula:

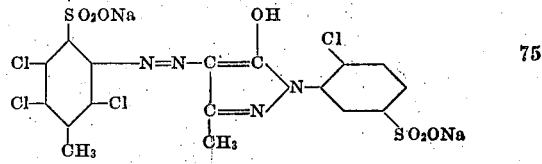

dyeing wool a pure yellow tint of excellent fastness to water, sodium carbonate and hot pressing, and of an eminently good fastness to light.

In testimony whereof, we affix our signatures.

HERMANN WAGNER.
BARTHOLOMÄUS VOSSEN.